United States Patent
Dicaire et al.

(10) Patent No.: US 10,120,350 B2
(45) Date of Patent: Nov. 6, 2018

(54) BACKGROUND COLLECTION OF DIAGNOSTIC DATA FROM FIELD INSTRUMENTATION DEVICES

(71) Applicant: FISHER-ROSEMOUNT SYSTEMS, INC., Round Rock, TX (US)

(72) Inventors: Andre A. Dicaire, Chestermere (CA); Trevor D. Schleiss, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 371 days.

(21) Appl. No.: 13/793,374

(22) Filed: Mar. 11, 2013

(65) Prior Publication Data
US 2014/0257529 A1 Sep. 11, 2014

(51) Int. Cl.
G05B 15/02 (2006.01)
G05B 19/04 (2006.01)
G05B 23/02 (2006.01)

(52) U.S. Cl.
CPC ......... *G05B 15/02* (2013.01); *G05B 23/0267* (2013.01)

(58) Field of Classification Search
CPC .............................. G05B 15/02; G05B 23/0267
USPC .............................. 700/17, 21, 28, 52, 79, 83
See application file for complete search history.

(56) References Cited

U.S. PATENT DOCUMENTS

| | | | |
|---|---|---|---|
| 5,734,567 A | | 3/1998 | Griffiths et al. |
| 5,768,119 A | * | 6/1998 | Havekost et al. ................. 700/4 |
| 5,960,214 A | * | 9/1999 | Sharpe et al. ................. 710/15 |
| 5,978,850 A | * | 11/1999 | Ramachandran et al. .... 709/228 |
| 6,016,523 A | * | 1/2000 | Zimmerman ........ G05B 19/054 710/303 |
| 6,774,786 B1 | * | 8/2004 | Havekost et al. ............ 340/517 |
| 7,043,311 B2 | * | 5/2006 | Nixon et al. .................... 700/83 |
| 7,072,987 B2 | * | 7/2006 | Jurisch ................ G05B 19/042 700/17 |
| 7,200,775 B1 | * | 4/2007 | Rhea et al. ..................... 714/27 |

(Continued)

FOREIGN PATENT DOCUMENTS

| | | | | |
|---|---|---|---|---|
| GB | 2446258 A | * | 8/2008 | ........... G05B 19/042 |
| GB | 2483970 A | * | 3/2012 | ............. G06F 17/30 |

(Continued)

OTHER PUBLICATIONS

Search Report for Application No. GB1402312.1, dated Aug. 5, 2014.

(Continued)

*Primary Examiner* — M.N. Von Buhr
(74) *Attorney, Agent, or Firm* — Marshall, Gerstein & Borun LLP

(57) ABSTRACT

In a method and system, a device tag allows automatic configuration of a process control system to download and cache device diagnostic data associated with one or more process control field devices. The device diagnostic data are downloaded and cached using bandwidth not otherwise required for real-time process control communications. The device diagnostic data may be polled asynchronously and/or according to a low priority, background task. The device diagnostic data include one or more non-static parameter values. The cached parameter values may be used in display routines, control routines, or any routine for which the update frequency is sufficient. Each cached parameter value may also have associated with it a status.

30 Claims, 11 Drawing Sheets

(56) References Cited

U.S. PATENT DOCUMENTS

| | | | |
|---|---|---|---|
| 8,019,546 B1* | 9/2011 | Osburn, III | 702/3 |
| 8,495,263 B2* | 7/2013 | Harish | G05B 19/0423 |
| | | | 710/63 |
| 8,676,219 B2* | 3/2014 | Pratt, Jr. | G01D 21/00 |
| | | | 370/389 |
| 8,745,281 B2* | 6/2014 | Petzen et al. | 710/9 |
| 8,977,681 B2* | 3/2015 | Zhu | H04L 67/2847 |
| | | | 709/200 |
| 9,038,150 B2* | 5/2015 | Kodama | G05B 19/0423 |
| | | | 713/168 |
| 9,294,582 B2* | 3/2016 | Tuliani | H04L 67/2842 |
| 9,495,313 B2* | 11/2016 | Burr | G05B 19/042 |
| 9,558,220 B2* | 1/2017 | Nixon | G06F 17/30312 |
| 9,697,170 B2* | 7/2017 | Nixon | G05B 19/4185 |
| 2003/0235211 A1* | 12/2003 | Thiru | H04L 69/329 |
| | | | 370/469 |
| 2004/0230328 A1* | 11/2004 | Armstrong | G05B 19/418 |
| | | | 700/83 |
| 2005/0028037 A1* | 2/2005 | Junk | G05B 19/0428 |
| | | | 714/39 |
| 2006/0168396 A1* | 7/2006 | LaMothe | G05B 23/0221 |
| | | | 711/113 |
| 2006/0241913 A1* | 10/2006 | De Groot et al. | 702/188 |
| 2008/0065743 A1 | 3/2008 | Kase | |
| 2008/0079596 A1* | 4/2008 | Baier | G05B 23/0235 |
| | | | 340/679 |
| 2008/0082308 A1 | 4/2008 | Kant et al. | |
| 2008/0189441 A1* | 8/2008 | Jundt et al. | 710/3 |
| 2008/0255681 A1* | 10/2008 | Scott | G05B 23/0216 |
| | | | 700/12 |
| 2009/0249237 A1* | 10/2009 | Jundt | G05B 19/0426 |
| | | | 715/769 |
| 2009/0292996 A1* | 11/2009 | Anne | G05B 19/0428 |
| | | | 715/736 |
| 2010/0088471 A1* | 4/2010 | Sunaga | G06F 15/167 |
| | | | 711/130 |
| 2010/0095065 A1* | 4/2010 | Gray | G06F 17/30241 |
| | | | 711/122 |
| 2010/0149997 A1* | 6/2010 | Law et al. | 370/248 |
| 2010/0268888 A1* | 10/2010 | Gheith | G06F 12/0811 |
| | | | 711/125 |
| 2011/0131341 A1* | 6/2011 | Yoo | G06F 17/30902 |
| | | | 709/237 |
| 2011/0144777 A1 | 6/2011 | Firkins et al. | |
| 2011/0313547 A1* | 12/2011 | Hernandez | G05B 19/042 |
| | | | 700/23 |
| 2013/0095864 A1* | 4/2013 | Marovets | 455/466 |
| 2013/0149097 A1 | 6/2013 | Kelderman | |
| 2013/0191597 A1* | 7/2013 | Washiro | G06F 12/0897 |
| | | | 711/123 |
| 2014/0044265 A1* | 2/2014 | Kocher et al. | 380/277 |
| 2014/0277656 A1* | 9/2014 | Nixon | G06F 15/17331 |
| | | | 700/95 |
| 2014/0280678 A1* | 9/2014 | Nixon | G06F 15/17331 |
| | | | 709/213 |

FOREIGN PATENT DOCUMENTS

| | | | | |
|---|---|---|---|---|
| JP | 08-503089 A | | 4/1996 | |
| JP | 2003333121 A | * | 11/2003 | H04L 29/08 |
| JP | 2006-004184 A | | 1/2006 | |
| JP | 2006091961 A | * | 4/2006 | G05B 19/05 |
| JP | 2010-506259 A | | 2/2010 | |
| JP | 2011-123885 A | | 6/2011 | |
| JP | 2012-198606 A | | 10/2012 | |
| JP | 2013-149087 A | | 8/2013 | |

OTHER PUBLICATIONS

Notice of Reasons for Rejection for Japanese Application No. 2014-046246, dated Dec. 12, 2017.
First Office Action received in counterpart Chinese Patent Application No. 201410091060.9, dated Jul. 26, 2017.
Notice of Reasons for Rejection for Japanese Application No. 2014-046246, dated May 29, 2018.
Second Office Action received in counterpart Chinese Patent Application No. 201410091060.9, dated Jun. 14, 2018.

* cited by examiner

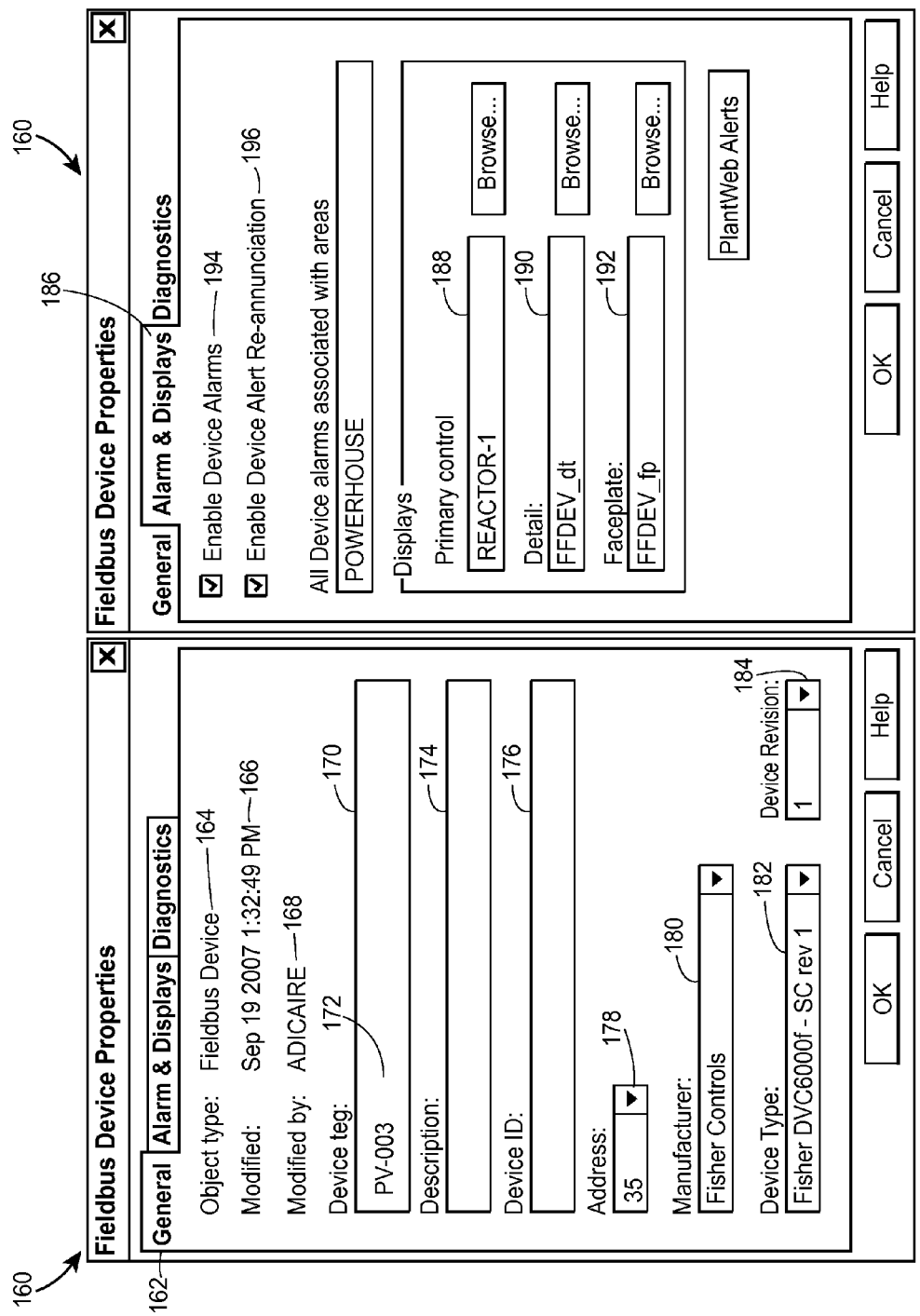

| 🔔 ▶ | Date / Time in ▶ | Tag ▶ | Tag Description | Catorgy ▶ | Alarm ▶ | Message ▶ |
|---|---|---|---|---|---|---|
| ✖ | 05/22/08 6:30:12am | TT-001 | Temperature at craker inlet | Device | Failed | Bad Sensor |
| ✖ | 05/22/08 6:31:11am | FIC-201 | Flow from tank 201 | Process | Hi Hi | High High Flow |
| ✖ | 05/22/08 6:31:32am | FIC-222 | Flow to tank 222 | Process | Hi Hi | High High Flow |
| ✖ | 05/22/08 6:32:16am | TIC-333 | Heating at lube 1 | Device | Hi Hi | High High Temperature |
| ⚠ | 05/22/08 6:32:22am | ◀FIC-345 | Flow loop at pump | Process | Hi | High Flow |
| ⚠ | 05/22/08 6:32:45am | FIC-344 | Flow loop at compressor FCCU | Process | Hi | High Flow |
| ⚠ | 05/22/08 6:32:53am | FIC-225 | Flow loop at reboilder hydrotreater | Process | Lo | Low Flow |
| ▶ | 05/22/08 6:33:12am | Controller 1 | Regenerator Controller | System | Maintenance | Redundant Partner Not Available |
| ▶ | 05/22/08 6:33:34am | FV-225 | Reactor 1 water valve | Device | Maintenance | ◀Valve stiction alert |
| ▶ | 05/22/08 6:33:54am | FV-204 | Flow valve | Device | Maintenance | ◀Valve Sticking |

*FIG. 7*

BACKGROUND COLLECTION OF DIAGNOSTIC DATA FROM FIELD INSTRUMENTATION DEVICES

FIELD OF TECHNOLOGY

The present disclosure relates generally to process control systems and, more particularly, to process control systems having cached diagnostic data available for use by the runtime operator environment.

BACKGROUND

Process control systems, like those used in chemical, petroleum or other processes, typically include one or more centralized or decentralized process controllers communicatively coupled to at least one host or operator workstation. The process controllers are also typically coupled to one or more process control and instrumentation devices such as, for example, field devices, via analog, digital or combined analog/digital buses. Field devices, which may be valves, valve positioners, switches, transmitters, and sensors (e.g., temperature, pressure, and flow rate sensors), are located within the process plant environment and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the Highway Addressable Remote Transmitter (HART®) protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART® and Fieldbus field devices. The control modules in the process controllers send the control signals over the communication lines or signal paths to the field devices to control the operation of the process.

Information from the field devices and the process controllers is typically made available to one or more other hardware devices such as operator workstations, maintenance workstations, personal computers, handheld devices, data historians, report generators, centralized databases, etc., to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, and diagnosing problems or hardware failures within the process plant.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially within a process plant having a large number of field devices and supporting equipment. These problems may be broken or malfunctioning devices, logic elements, such as software routines, residing in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant.

Additionally, many field devices, and especially smart field devices, include diagnostic data of interest to operators and maintenance personnel. Some such diagnostic data may include whether the device is in service (i.e., device state information), a calibration due date, various device alarms and alerts etc. Other such data includes information specific to the device, the device type, the manufacturer, or the process control system in which the device is operating. Still other diagnostic data includes processed statistical data originating within the field device. For example, the field device may be equipped or programmed with one or more statistical processing modules (SPMs) that collect and process data from one or more sensors within the field device.

Operator workstations, which are typically connected to the process controllers through communication connections such as a direct or wireless bus, Ethernet, modem, phone line, and the like, have processors and memories that are adapted to run software, such as the DeltaV™ and Ovation® control systems, sold by Emerson Process Management. These control systems have numerous control module and control loop diagnostic tools. Maintenance workstations may also be communicatively connected to the process control devices via object linking and embedding (OLE) for process control (OPC) connections, handheld connections, etc. The workstations typically include one or more operator applications designed to provide an operator a user interface for controlling the operation, and one or more maintenance and/or diagnostic applications designed to provide an interface that allows an operator to view maintenance alarms and alerts generated by field devices within the process plant, to test devices within the process plant, and to perform maintenance activities on the field devices and other devices within the process plant. Diagnostic applications have also been developed to diagnose problems within the supporting equipment within the process plant.

Commercial software such as the AMS™ Suite: Intelligent Device Manager from Emerson Process Management enables communication with and stores data pertaining to field devices to ascertain and track the operating state of the field devices. See also U.S. Pat. No. 5,960,214, entitled "Integrated Communication Network for use in a Field Device Management System." In some instances, the AMS™ Suite: Intelligent Device Manager software may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, a maintenance technician may use this information to monitor, maintain, and/or diagnose problems with field devices.

Similarly, many process plants include equipment monitoring and diagnostic applications such as, for example, the Machinery Health® application provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, or to calibrate field devices or other equipment.

The variation between field devices (and other process control equipment) generally requires specialized maintenance and diagnostic software to take full advantage of the available diagnostic data. The specialized software downloads information from associated process control equipment upon request or need, potentially delaying communication of other data and consuming communication bandwidth that the system could otherwise use for transmitting and receiving real-time process signals. That is, diagnostic data and other process control data are not always readily available for use by a control or display application, as it often requires a third-party application to read and return the data to the control system.

SUMMARY OF THE DISCLOSURE

In a method for controlling a process, the method includes communicatively coupling a process control field device a process controller via an input/output device, obtaining a device tag for the field device, and configuring the input/output device according to data in the device tag to retrieve device diagnostic data from the field device, cache the device diagnostic data, and provide one or more applications access to the cached device diagnostic data. The method also includes retrieving the device diagnostic data from the field device, caching the device diagnostic data, and providing the cached device diagnostic data to the one or more applications. Additionally, obtaining a device tag for the field device may include retrieving device tag data from the field device. In some embodiments, retrieving the device diagnostic data from the field device may include retrieving from the field device a value for at least one non-static parameter and, in some embodiments, the non-static parameter may be one of a calibration state, a calibration due date, a device state, an alert status, an alarm status, a device health status, a measured process parameter, an input of a function block, and an output of a function block and, specifically, may be the output of a statistical processing module block. In embodiments of the method, retrieving the device diagnostic data from the field device may include polling the device diagnostic data utilizing bandwidth not otherwise required for real-time process control communications, polling the device diagnostic data according to an asynchronous call, and/or polling the device diagnostic data according to a low priority, background task. The method may also include determining a data status for each of one or more cached device diagnostic data values and storing the determined data status as associated with the corresponding cached diagnostic data value. In some embodiments of the method, determining a data status includes determining a time elapsed since the cached device diagnostic data value was retrieved, comparing the time elapsed to a predetermined threshold value, determining that the data status is good if the time elapsed is less than the predetermined threshold value, and determining that the data status is bad if (1) the time elapsed is greater than the predetermined threshold value or (2) an active communication alert exists for the field device from which the device diagnostic data value was retrieved. Caching the device diagnostic data may include caching the device diagnostic data in a memory device of the input/output device, in some embodiments of the method.

In a process control system, a process controller executes one or more process control routines to control a process. An input/output device communicates with the process controller. A plurality of field devices are communicatively coupled to the input/output device via a bus and, via the input/output device, to the process controller. At least one of the plurality of field devices generates device diagnostic data. The system also includes a device tag associated with the at least one field device and storing data for configuring the input/output device to retrieve the device diagnostic data from the at least one field device. A first routine stored as instructions on a first memory device is operable to retrieve the device diagnostic data generated by the at least one field device. A cache storing device diagnostic data retrieved from the at least one field device. The system further includes a second routine operable to read the stored device diagnostic data from the cache and perform a process control function using the device diagnostic data. The device tag may be stored in the field device, in an embodiment. In some embodiments, the device diagnostic data generated by the at least one field device comprises a value for at least one non-static parameter, which may be a calibration state, a calibration due date, a device state, an alert status, an alarm status, a device health status, a measured process parameter, an input of a function block, or an output of a function block. The output of the function block may include the output of a statistical processing module block. In some embodiments, the first routine is operable to poll the at least one field device using bandwidth not otherwise required for real-time process control communications, is an asynchronous polling routine, and/or is a low priority, background task. The device diagnostic data stored in the cache may include one or more device diagnostic data values, each of the data values associated with a corresponding device diagnostic data parameter, and a data status corresponding to each of the one or more device diagnostic data values. The cache device may be disposed in the input/output device, in some embodiments. The second routine may be a device detail display routine, an alarm display routine, and/or a device faceplate display routine, in an embodiment.

BRIEF DESCRIPTION OF THE DRAWINGS

FIGS. 6A and 6B depict respective tabs of a configuration dialog box in accordance with the presently described system and method;

FIG. 7 illustrates one view in which device diagnostic data may be used according to the presently described system and method;

DETAILED DESCRIPTION

Figure 1:
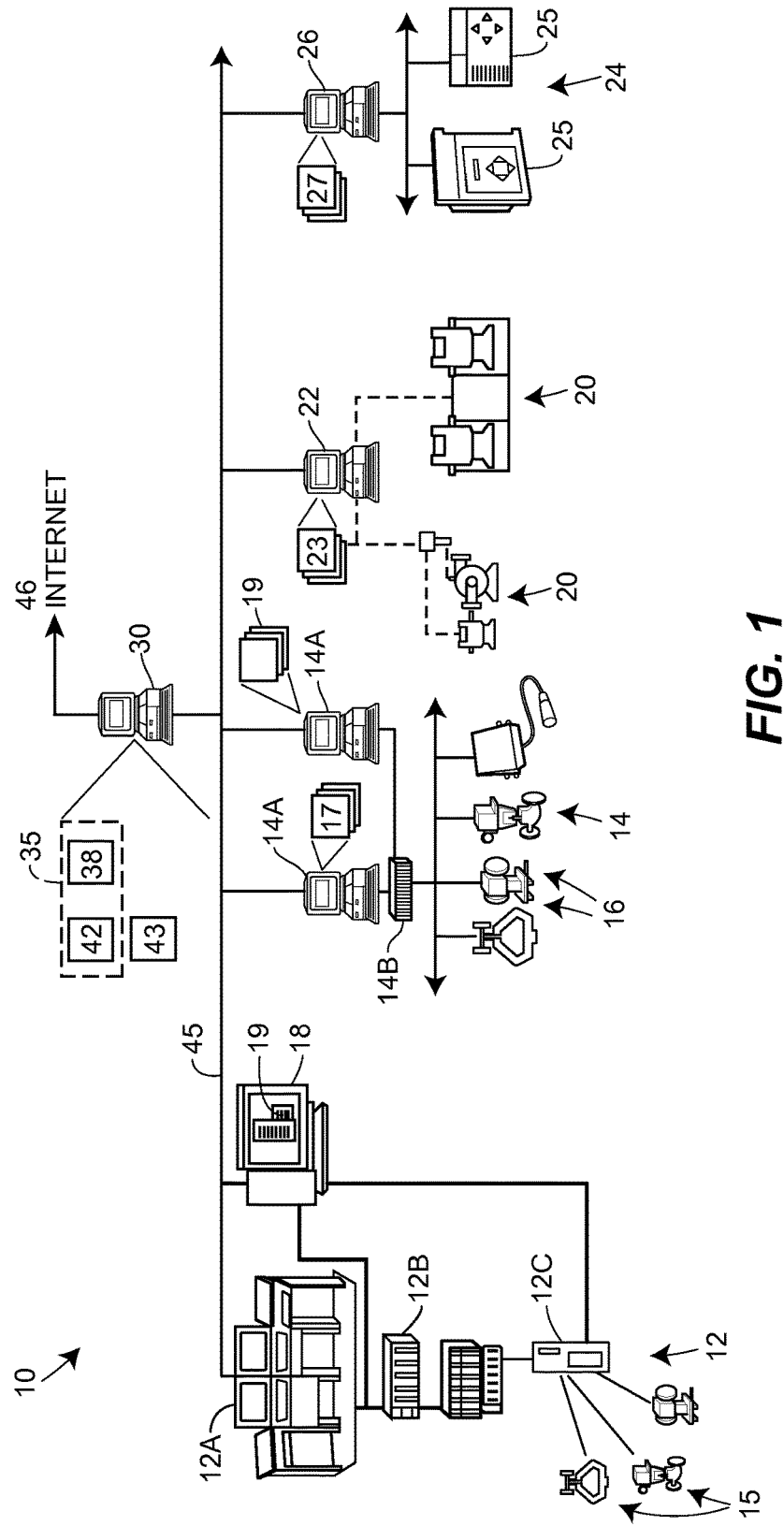
FIG. 1 depicts an exemplary process plant in accordance with the presently described system and method.

Referring now to FIG. 1, an exemplary process plant 10 in which background collection of diagnostic data may be implemented includes a number of control and maintenance systems interconnected together with supporting equipment via one or more communication networks. The process control system 12 may be a traditional process control system such as a PROVOX or RS3 system or any other control system which includes an operator interface 12A coupled to a controller 12B and to input/output (I/O) cards 12C, that, in turn, are coupled to various field devices such as analog and HART® field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART® or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the AMS™ Suite: Intelligent Device Manager application described above and/or the monitoring, diagnostics and communication applications described below may be connected to the process control systems 12 and 14 or to the individual devices therein to perform maintenance, monitoring, and diagnostics activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ Suite: Intelligent Device Manager application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute any number of monitoring and diagnostic applications 23, including commercially available applications, such as those provided by CSI (an Emerson Process Management Company), as well the applications, modules, and tools described below, to diagnose, monitor and optimize the operating state of the rotating equipment 20 and other equipment in the plant. Maintenance personnel usually use the applications 23 to maintain and oversee the performance of equipment 20 in the plant 10, to determine problems with the rotating equipment 20 and to determine when and if the equipment 20 must be repaired or replaced. In some cases, outside consultants or service organizations may temporarily acquire or measure data pertaining to the rotating equipment 20 and use this data to perform analyses for the rotating equipment 20 to detect problems, poor performance, or other issues effecting the rotating equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance, or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of a process control configuration system 35, and in particular, the computer system 30 stores and implements a configuration application 38, and, optionally, an abnormal operation detection system 42. Additionally, the computer system 30 may implement an alert/alarm application 43.

Generally speaking, the process control configuration system 35 may communicate with the field devices 15, 16, the controllers 12B, 14B, the rotating equipment 20 or its supporting computer 22, the power generation equipment 25 or its supporting computer 26, and any other desired devices and equipment within the process plant 10, and/or the abnormal operation detection system 42 in the computer system 30, to configure process control system. The process control configuration system 35 may be communicatively connected via a hardwired bus 45 to each of at least some of the computers or devices within the plant 10 or, alternatively, may be connected via any other desired communication connection including, for example, wireless connections, dedicated connections which use OPC, intermittent connections, such as ones which rely on handheld devices to collect data, etc. Further, the process control configuration system 35 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the process control configuration system 35 to computers/devices in the plant 10 are described herein, one of ordinary skill in the art will recognize that a variety of other methods of coupling the process control configuration and operation system 35 to computers/devices in the plant 10 can be used as well.

Figure 2A:
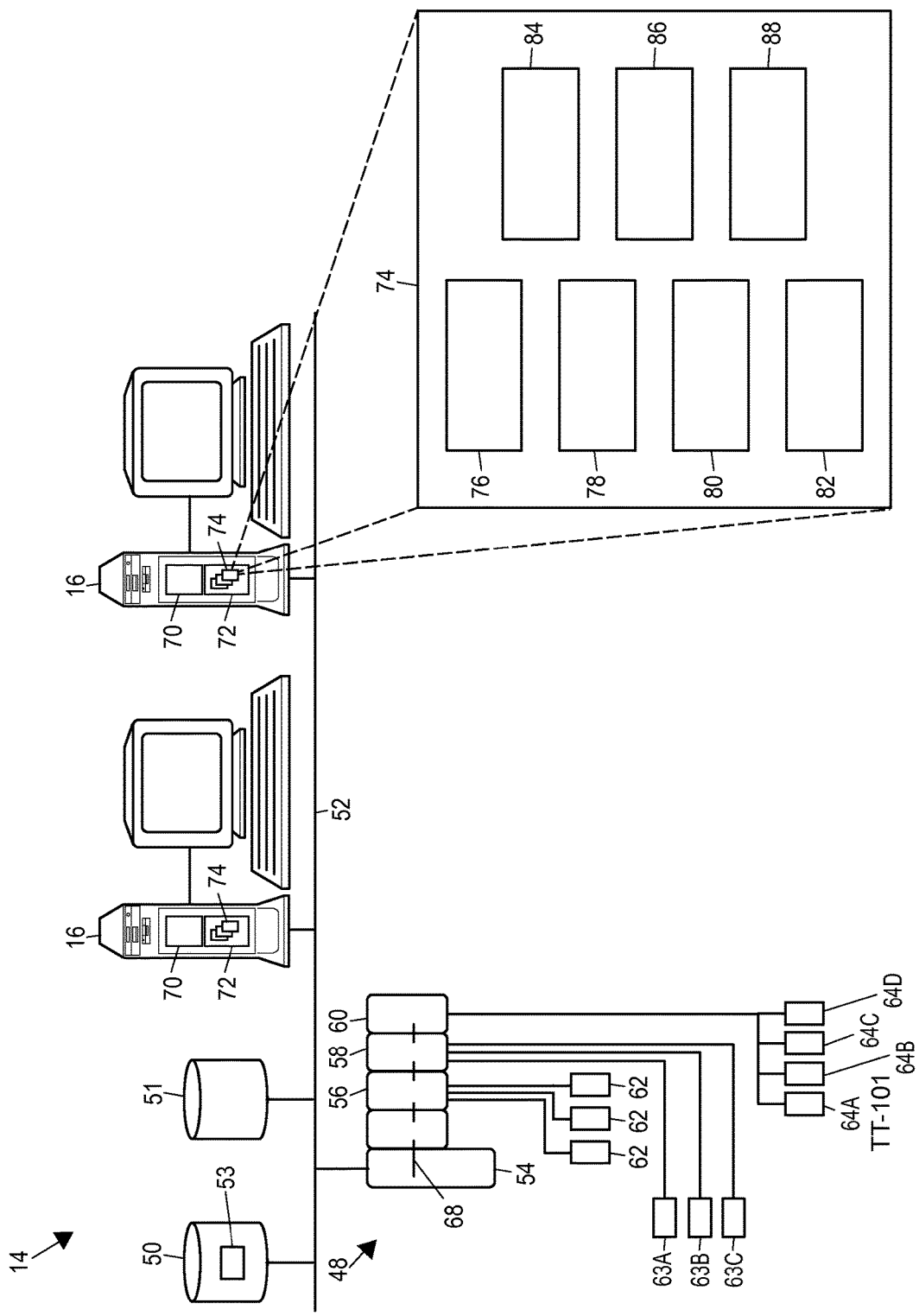
FIG. 2A is a block diagram depicting additional detail of the process control system of FIG. 1.

FIG. 2A depicts in additional detail a process control system, such as the process control system 14 of the process plant 10 illustrated in FIG. 1. The process control system 14 includes one or more host workstations, computers, or user interfaces 16 (which may be any type of personal computers, workstations, etc.) that are accessible by plant personnel, such as process control operators, maintenance personnel, configuration engineers, etc. In the example illustrated in FIG. 2A, two workstations 16 are shown as being connected to the process control node 48 and to a configuration database 50 and a data historian database 51 via a common communication line or bus 52. The communication network 52 may be implemented using any desired bus-based or non-bus based hardware, using any desired hardwired or wireless communication structure and using any desired or suitable communication protocol, such as an Ethernet protocol.

The node 48 is illustrated in FIG. 2A as including a process controller 54 (which may be a redundant pair of controllers including a redundant controller 55) as well as one or more process control system input/output (I/O) devices 56, 58, and 60. Each of the process control system I/O devices 56, 58, and 60 is communicatively connected to a set of process control related field devices, illustrated in FIG. 2A as field devices 62, 63A-C, and 64A-D. The process controller 54, the I/O devices 56, 58, 60, and the controller field devices 62, 63A-C, and 64A-D generally make up the process control system 14 of FIG. 2A. Of course, while FIG. 2A depicts only the single process controller 54 (and the redundant process controller 55) in a single node 48, a process plant may have any number of nodes including any number of process controllers.

The process controller 54, which may be, by way of example only, a DeltaV™ controller sold by Emerson Process Management or any other desired type of process controller is programmed to provide process control functionality (using what are commonly referred to as control modules) using the I/O devices 56, 58, and 60 and the field devices 62, 63A-C, and 64A-D. In particular, the controller 54 implements or oversees one or more process control routines 66 (also referred to a control modules) stored therein or otherwise associated therewith and communicates with the field devices 62, 63A-C, and 64A-D and the workstations 16 to control the process or a portion of the process operating in the process plant 10 in any desired manner. The field devices 62, 63A-C, and 64A-D may be any desired types of field devices, such as sensors, valves, transmitters, positioners, etc., and may conform to any desired open, proprietary or other communication or programming protocol including, for example, the HART or the 4-20 ma protocol (as illustrated for the field devices 62), any Fieldbus protocol such as the Foundation® Fieldbus protocol (as illustrated for the field devices 63A-C, 64A-D), or the CAN, Profibus, the AS-Interface protocols, to name but a few. Similarly, the I/O devices 56, 58, and 60 may be any known types of process control I/O devices using any appropriate communication protocol(s).

A common backplane 68 (indicated by a dotted line through the controller 54 and the I/O devices 56, 58, 60) connects the controller 54 to the process control I/O cards 56, 58, 60. The controller 54 is also communicatively coupled to, and operates as a bus arbitrator for the bus 52, to enable each of the I/O devices 56, 58, 60 to communicate with any of the workstations 16 via the bus 52.

The exemplary process control system 14 of FIG. 2A includes a workstation 16 that may used to configure inputs and outputs for the example process control system 14. As an example, the DeltaV™ control system sold by Fisher-Rosemount Systems, Inc. an Emerson Process Management company supports the configuration of process control functions using module and/or unit class objects. During the configuration of such objects, a field device tag is configured (e.g., associated) with each input and/or output block of each object. As used herein, a field device tag is a logical entity that includes information identifying the type of the field device and an assigned name (i.e., tag) for the field device. However, in some embodiments, the field device tag also includes configuration information related to other information about or generated by the field device including, by way of example and not limitation, calibration data, calibration state, device state, default contextual displays and/or menus, documentation, function block input and/or output data (including output of one or more statistical process module (SPM) function blocks), transmitter data, etc. In some examples, the configuration also includes the assignment of the field device tag to a particular input/output (I/O) port and/or I/O channel of an I/O gateway. In other examples, the binding and/or associating of a field device tag to a particular I/O port and/or I/O channel of an I/O gateway is completed automatically. If the configuration of the objects includes the assignment of the field device tags to I/O ports and/or I/O channels, the field device tags can, as described below, be used to verify the configured assignment of I/O ports and/or I/O channels against the actual wiring of the field devices to I/O ports and/or I/O channels. For example, field device tags can be configured to process control modules by importing instrument lists in the form of a spreadsheet, comma-separated values and/or eXtensible Markup Language (XML) files. Such instrument lists may also used to configure I/O devices with the device tags for attached field devices 62, 63A-C, 64A-C.

Figure 2B:
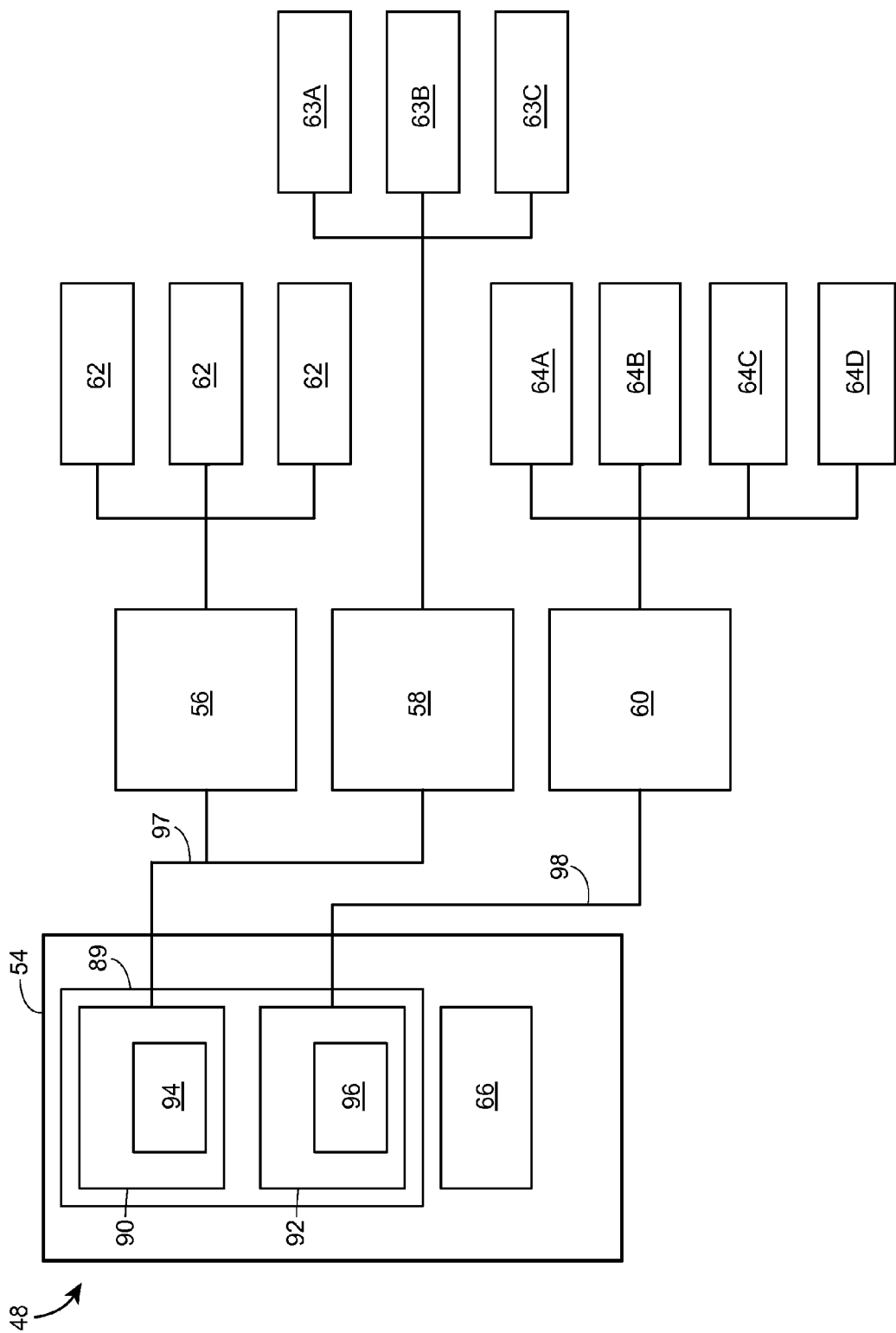
FIG. 2B is a block diagram depicting still further detail of the process control system of FIG. 1.

Referring to FIGS. 2A and 2B, the example process control system 14 includes one or more process control nodes (one of which is illustrated in FIGS. 2A and 2B with reference numeral 48) which includes one or more process controllers 54 communicatively coupled to the example workstation 16 and to the example field devices 62, 63A-C, 64A-D via one or more I/O gateways 89. The I/O gateways 89 include one or more I/O ports 90, 92 that communicatively couple the I/O gateway 89 to the I/O devices 56, 58, 60 via connections 97, 98 on the backplane 68. The I/O ports 90, 92 translate information received from the field devices 62, 63A-C, 64A-D to a signal, format and/or protocol compatible with the process controller 54 and/or translate information from the process controller 54 to a signal, format and/or protocol compatible with the field devices 62, 63A-C, 64A-D. Each I/O port 90, 92 can process input and/or output signals for more than one field device 62, 63A-C, 64A-D. As such, each I/O port 90, 92 assigns different field devices 62, 63A-C, 64A-D to different I/O channels of the I/O port 90, 92.

The example process controller 54 of FIGS. 2A and 2B automates control of the field devices 62, 63A-C, 64A-D by executing one or more process control strategies and/or routines 66 constructed and/or configured via the example workstation 16 and stored in the process controller. For instance, one of the example process strategies and/or routines 66 may involve measuring a pressure using a pressure sensor field device (e.g., the example field device 62) and automatically sending a command to a valve positioner (e.g., the example device 64A-D) to open or close a fluid control valve (64B) based on the pressure measurement. To correctly control the field devices 62, 63A-C, 64A-D, the example process controller 54 and the example I/O gateway 89 are configured with parameters that specify which field device 62, 63A-C, 64A-D is electrically and/or communicatively coupled to which I/O port 90, 92 and/or which I/O channel of an I/O port 90, 92 at the I/O gateway 89.

The common backplane 68 enables the process controller 54 to communicate with one or more of the field devices 62, 63A-C, 64A-D in one or more of the process nodes (e.g., the process control node 48) via the I/O devices 56, 58, 60, which are used to translate, marshal, organize, or route signals between the example field devices 62, 63A-C, 64A-D and one or more of the I/O ports 90, 92. The example I/O devices 56, 58, 60 of FIGS. 2A and 2B are smart devices that can be programmed with and/or automatically obtain information about a communicatively coupled field device 62, 63A-C, 64A-D. For example, the example I/O devices 56, 58, 60 are configured to store a value and/or string that identifies the type of a coupled field device 62, 63A-C, 64A-D, and a logical name and/or device tag that uniquely identifies the field device 62, 63A-C, 64A-D. For instance, the example I/O device 60 contains information identifying the example field device 64A as a temperature transmitter having a device tag of "TT-101."

As described above, device tags are used to logically associate and/or assign an input and/or output block of a control module to a particular field device 62, 63A-C, 64A-D. Once a device tag is associated with a particular I/O port 90, 92 and/or I/O channel, the field device 62, 63A-C, 64A-D becomes bound to the control module. Such process control system I/O binding may occur automatically based upon the sensing of I/O device 56, 58, 60 and/or field devices 62, 63A-C, 64A-D at the I/O gateway 89. Additionally or alternatively, such binding may occur during configuration of the process control module. When binding occurs during configuration of the control module, the example I/O gateway 89 can be used to sense the I/O devices 56, 58, 60 and/or the field devices 62, 63A-C, 64A-D coupled to the I/O gateway 89, thereby, allowing for the verification of the proper binding of process control modules to their respective field devices 62, 63A-C, 64A-D.

The example I/O devices 56, 58, 60 of FIG. 2A can be programmed with the device tag of a field device 62, 63A-C, 64A-D by a hand-held programmer and/or tagger (not shown) The tagger may be communicatively coupled to an I/O device 56, 68, 60 and used to program information into the I/O device 56, 58, 60. In some instances, the I/O device 56, 58, 60 are programmed as each of the field devices 62, 63A-C, 64A-D is wired to an I/O device 56, 58, 60. However, any sequence of wiring field devices 62, 63A-C, 64A-D to I/O devices 56, 58, 60 and programming I/O devices 56, 58, 60 may be used. Additionally or alternatively, an I/O devices 56, 58, 60 can automatically obtain the device type and/or logical tag of a smart field device 62, 63A-C, 64A-D (e.g., a Fieldbus device) directly from the smart field device 62, 63A-C, 64A-D.

In the illustrated example, each of the example I/O ports (e.g., in the process controller 54) includes a data structure 94, 96 that stores the device tags for field devices (e.g., the field devices 62, 63A-C, 64A-D) that are assigned to communicate with the I/O port 90, 92 via its respective universal I/O bus. The data structures 94, 96 can be populated by engineers, operators, and/or users via the workstation 16 using, for example, a configuration application (e.g., the configuration application 76). In some embodiments, the data structures 94, 96 may be populated automatically upon connection of a field device to the I/O device 56, 58, 60.

Additionally or alternatively, the data structures 94, 96 may be automatically generated by the workstation 16. For example, the example I/O gateway 89 may be directed to auto-sense which I/O devices 56, 58, 60 are communicatively coupled to its I/O ports 90, 92 to obtain the field device tags for each field device 62, 63A-C, 64A-D communicatively coupled to the sensed I/O 56, 58, 60. For example, from the DeltaV™ Explorer™ a user of the workstation 16 can execute a function (via, for example, a button, menu, etc.) that causes the I/O gateway 89 to perform the auto-sensing. The I/O gateway 89 also obtains and/or determines the I/O channel and/or slot of the universal I/O bus carrying the field device data for the sensed field devices 62, 63A-C, 64A-D. The example I/O gateway 89 reports the collected information to the workstation 16.

Because the device tags may include, automatically configure, or cause to be automatically configured, information other than the tag name and information related to the device type, such as device diagnostic data, the data structures 94, 96 may also store the device diagnostic data. In an embodiment, the device tag and, therefore, the data stored in the data structures 94, 96 may also include, by way of example and not limitation, some or all of: context menu choices for configuration, operation, and maintenance contexts; vendor documentation or links thereto; diagnostic information; maintenance information; alert configuration; control information such as function blocks, statistical processing module blocks, etc.; control and/or maintenance views (e.g., faceplate views), etc. Some of the information may be static information (i.e., information that does not change in runtime) such as a tag name (e.g., FY-101, TT-101, etc.), a description (e.g., "my favorite valve"), a device manufacturer (e.g., Rosemount, Fisher, etc.), a model (3051, DVC600, etc.), a revision (e.g. rev 6), a device type (e.g., pressure transmitter, valve, etc.), or a user-definable string (e.g., device location—"building 3, 4th floor"). Other information included in the device tag and stored in the data structures 94, 96 may be dynamic (i.e., non-static) and, therefore, may change during runtime. Examples of such information includes function block data (e.g., data generated by statistical processing model (SPM) blocks), alert and/or alarm data, diagnostic information, and/or maintenance information. Dynamic data the retrieval of which is configured by the device tag and/or stored in the data structures 94, 96 are referred to herein as "device diagnostic data."

Referring again to FIG. 2A, each of the workstations 16 includes a processor 70 and a memory 72 that may store any number of applications 74 for execution on the processor 70, including, by way of example and not limitation, user interface applications, configuration applications, diagnostic and/or viewing applications, device management applications, diagnostic data polling applications, data historian applications, etc. FIG. 2A illustrates the memory 72 of one of the workstations 16. The memory 72 is illustrated as including a configuration application 76, one or more third-party diagnostics applications 78, an operator interface application 80, a historian application 82, an asset management application 84, one or more plug-in applications 86, and a diagnostic data polling application 88. However, if desired, one or more, or all, of these applications could be stored and executed in different ones of the workstations 16 or in other computers associated with the process plant 10.

Generally speaking, the configuration application 76 provides configuration information to a configuration engineer and enables the configuration engineer to configure some or all elements of the process plant 10 and to store that configuration in the configuration database 50. As part of the configuration activities performed by the configuration application 76, the configuration engineer may create control routines or control modules for the process controller 54 and may download these different control modules to the process controllers 54 via the bus 52 and controllers 54. Similarly, the configuration application 76 may be used to create and download other programs and logic to the I/O devices 56, 58, 60, to any of the field devices 62, 63A-C, and 64A-D, etc. As will be understood, these process control modules for the process control system may be created independently of the devices in which these modules will be executed and may be communicatively tied together by directly referencing one another to thereby enable the process control system logic to communicate before being assigned to any particular devices. This feature enables the process control system modules to be created and stored as templates, provides for easier portability of these modules when devices within the process plant are changed, removed, etc., and generally allows the logical configuration of the process control system 12 prior to the physical devices associated with these systems being put into place.

Figure 2C:
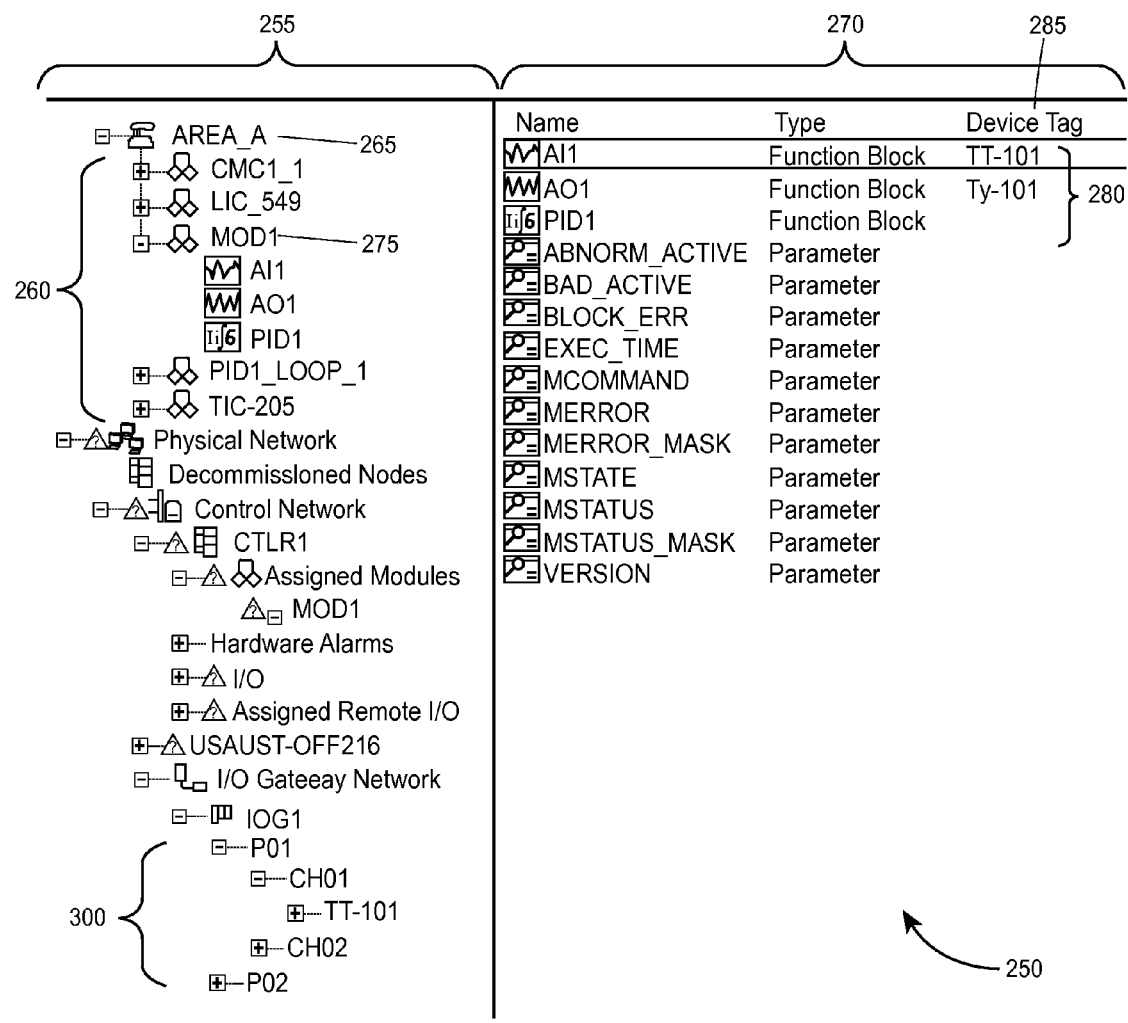
FIG. 2C depicts an exemplary user interface which may be used to configure the process control system of the preceding figures.

Turning now to FIG. 2C, an example user interface 250, which may be displayed as part of, for example, the configuration application 76, displays assignment and/or configuration of device tags to function blocks. To display a hierarchy of control modules, the example user interface 250 of FIG. 2C has a left-hand portion 255. The example left portion 255 displays a list of units 260 for a process area 265 named "AREA_A."

To display function blocks and parameters, the example display 250 of FIG. 2C includes a right-hand portion 270. The example right-hand portion 270 of FIG. 2C displays a list of function blocks and/or parameters associated with a selected one of the units 260, e.g., an example "MOD1" unit 275. For each function block 280 of example MOD1 unit 275, the example right-hand portion 270 includes a device tag 285. For example, an example function block A11 has been configured to the field device 64A that has the field device tag of "TT-101." As described in U.S. Pat. No. 7,043,311, field device tags can be configured and/or assigned to function blocks by importing instrument lists in the form of a spreadsheet, comma-separated values and/or XML files.

Persons of ordinary skill in the art will readily appreciate that the example hierarchy illustrated in the example left-hand portion 255 of FIG. 2C is merely illustrative and may be modified in any number of ways. For example, the example port and channel components 300 shown in FIG. 2C may be omitted so that a field device tag need only be associated with an I/O gateway 89. The I/O gateway 89 could use any number and/or type(s) of addressing schemes to identify and/or communicate with a particular field device 62, 63A-C, 64A-D. However, such addressing schemes could be implemented with an installer's and/or operator's knowledge and/or involvement. Moreover, such addressing schemes need not be tied to the use of I/O ports 90, 92 and/or channels of I/O ports.

Referring still to FIG. 2A, the asset management application 84 may be a native diagnostic application designed to operate with other applications of the process control system, such as with the configuration application 76, the operator interface application 80, and the data historian application 82. The asset management application, which may be, for example, the Asset Management Solutions (AMS) tool manufactured and sold by Emerson Process Management can be used for this purpose to communicate with a device, to obtain specific information therewith, and to implement diagnostics associated with the device. Of course, other third-party diagnostics tools could be used as well.

The one or more third-party diagnostic applications 78 may provide one or more displays to a user, such as to a process control operator, a safety operator, etc., which includes information about the state of the process control system 12, if so desired. Though illustrated as a third-party application, the one or more diagnostics applications 78 may be any diagnostics application other than the Asset Management application 84. For example, the diagnostic application 78 may be an alarm display application that receives and displays to an operator indications of alarms. If desired, such an alarm viewing application may take the form as disclosed in U.S. Pat. No. 5,768,119 entitled "Process Control System Including Alarm Priority Adjustment" and U.S. patent application Ser. No. 09/707,580 entitled "Integrated Alarm Display in a Process Control Network," both of which are assigned to the assignee of this patent and are hereby expressly incorporated by reference herein.

The operator interface application 80 may be any type of interface that, for example, enables a user to manipulate data values (e.g., perform reads or writes) to thereby alter the operation of control modules within the control system while providing the correct level and type of security. Thus, for example, if a write is specified to be made to a control module associated with the control system 12, such as to the control module 54 or to one of the field devices 62, for example, the application 80 enforces the correct security procedures to enable that write to take place.

The data historian application 82 may connect via the computer 16 and the communication bus 52 to the historian database 51 to collect and store abnormal situation prevention data, including statistical data collected by the field devices 64A-D and 66 within the process plant 10, statistical data determined from process variables collected by the field devices 64A-D and 66, and any other type or types of data for which historical data may be useful to detect, diagnose, and/or prevent abnormal situations, optimize the process, etc. Of course, the databases 50 and 51, while illustrated as separate in FIG. 2A, may be combined such that a single database stores configuration information as well as on-line process variable, parameter data, status data, and other data associated with the process controller 54 and field devices 62, 63A-C, and 64A-D within the process plant 10. Thus, the database 51 may operate as a configuration database to store the current configuration, including process configuration modules, as well as control configuration information for the process control system 12 as downloaded to and stored within the process controller 54 and the field devices 62, 63A-C, and 64A-D. Likewise, the database 50 may store historical data as described with respect to the database 51.

The one or more plug-in applications 86 may include any plug-in application useable with the configuration application 76, the diagnostics applications 78, the operator interface 80, the asset management application 84, or other related applications. For instance, in the DeltaV system, sold by Emerson Process Management, a plug-in may be imported to the DeltaV system to create a new device type in a device library. For example, a ValveLink Plug-in could extend existing device information to add ValveLink documentation, ValveLink Maintenance context choices, ValveLink Maintenance information, ValveLink, Alert information and default configurations, etc.

The diagnostic data polling application 88 may operate to poll device diagnostic data using available synchronous or asynchronous calls. The diagnostic data polling application 88 may also cache the retrieved device diagnostic data for use by one or more of the applications 76-86. Of course, the diagnostic data polling application 88 need not necessarily be implemented as a separate application. Instead, the diagnostic data polling application 88 may be implemented as part of one or more other applications, including, for example, the operator interface application 80, one or more function blocks implemented in the control routines 66, one or more routines executing on the I/O devices 56, 58, 60, etc. The processor 70 executing the diagnostic data polling application 88 may cache the retrieved device diagnostic data in the historian database 51 and/or in the memory 72 and/or in the data structures 94, 96. In process plants in which multiple workstations 16 execute various ones of the applications or in which multiple workstations 16 execute multiple copies of one or more applications, the retrieved device diagnostic data may be stored in the historian database 51 and/or in the data structures 94, 96 for access by each of the workstations 16 and/or applications 76-86. The retrieved device diagnostic data may, in some embodiments, also be replicated and/or synchronized in one or more of the memories 72 associated with the workstations 16.

In some embodiments, the diagnostic data polling application 88 configures the retrieval of device diagnostic data to occur as a lower priority task and/or as a background task. That is, the diagnostic data polling application 88 may be configured such that retrieval of device diagnostic data does not adversely affect the any control operation. The communication of device diagnostic data may thereby utilize bandwidth that is not otherwise required for real-time process control communications. Moreover, depending on how the device diagnostic data are used, the device diagnostic data need not necessarily be polled with a repeatable or periodic schedule. Instead, the update protocol may depend on device protocol and/or bus loading. In such instances, activities such as AMS pass-through communication and device download activity may receive priority over diagnostic parameter updates and may cause significant delays to updates. For example, it may be acceptable for device diagnostic data from a Fieldbus transducer or resource block to be updated only when there is bandwidth available on the bus.

Periodically polling and caching the device diagnostic information allows use of the device diagnostic data for a number purposes for which the information was previously unavailable. For example, in some embodiments the device diagnostic data may be integrated into the control system without the need for a configuration engineer to explicitly configure communication of the device diagnostic data for each device. Advantageously, and in contrast to previous systems, the device diagnostic data may be retrieved and cached without necessitating execution of an application other than the operator interface application 80, such as the third-party diagnostic application 78 or the asset management system 84. This approach eliminates or, at least, mitigates the communication delays, processing requirements, and memory constraints incurred by an approach in which a specialized application must be executed to read and/or store the data included in the device diagnostic data.

In contrast to static device information such as tag name, description, device manufacturer, model, revision, device type, etc., which do not change during runtime, device diagnostic data may be static or dynamic. Dynamic diagnostic data may change only infrequently (e.g., calibration due dates), or may change more frequently (e.g., device health data, alarm status, alert status, device state, etc.). In any event, in some embodiments each device compatible with the process control system may have associated with it in a configuration library 53 (e.g., in the configuration database 50) a device tag for configuring the process control system to operate with an associated field device. The device tag may include configuration of the device diagnostic data for the field device. For example, the configuration library 53 may include a device tag corresponding to a type of valve and, when bound to a particular instance of the valve type, may configure process control system with a device tag data and device diagnostic data. Specifically, the process control system may be configured with a valve name, description and type, and may also be configured to access calibration data of the valve, calibration state of the valve, the valve's device state, data output by SPM modules in the valve, etc.

In some embodiments, smart field devices may have a device tag stored in a memory device in the field device. The device tag may be retrieved from the memory of the field device automatically upon connection of the field device to the process control system, and the process control system may be automatically configured to operate with the field device. The device tag, including the device tag data and the device diagnostic data, may be automatically bound to the field device and may store and/or cache the device tag in the memory 72 and/or in the data structures 94, 96.

All device information associated with the device tag, including the device tag data, data for configuring the device diagnostic data, and the device diagnostic data itself, may include a description, a value, and a value status. In some embodiments, the value status of a device diagnostic data value may be determined, for example, based on the ability to update the value in a timely manner. For example, for a device diagnostic data value, the data status may indicate "BAD" if the system is unable to update the device diagnostic data values within a given time period (e.g., 30 minutes) or if there is an active communication alert for the device, may indicate "UNKNOWN" or "UNCERTAIN" if there is a mismatch between the version of the configured device and the version of the actual device, may indicate "GOOD" if the data are successfully updated, etc. In some embodiments, device diagnostic data status may be determined by the field device. In an example, a calibration state value may be "Calibrated" and the calibration state value status may indicate "GOOD" if the calibration state value has been updated within a predetermined time period (e.g., 30 minutes, 1 hour, etc.), but may indicate "BAD" if the calibration state value has not been updated within the predetermined time period. The predetermined time period may vary according to the particular device diagnostic data value. In another example, the value status of a value corresponding to the output of a statistical process module (SPM) block may indicate "GOOD" if the value of the output of the SPM block has been updated within a different predetermined time period (e.g., five minutes, 10 minutes, 1 minute, etc.), but may indicate "BAD" if the value of the output of the SPM block has not been updated within the time period.

Because the device diagnostic data values may be accessible by multiple applications and, in particular, by the configuration and operator interface applications, the device diagnostic data values may be implemented as control signals such that the data value may be used in a control strategy. When a device diagnostic data value is implemented as a control signal, it may have the same update requirements as other control information. Of course, various communication protocols may limit the rate at which updates may occur over the protocol.

Figure 3:
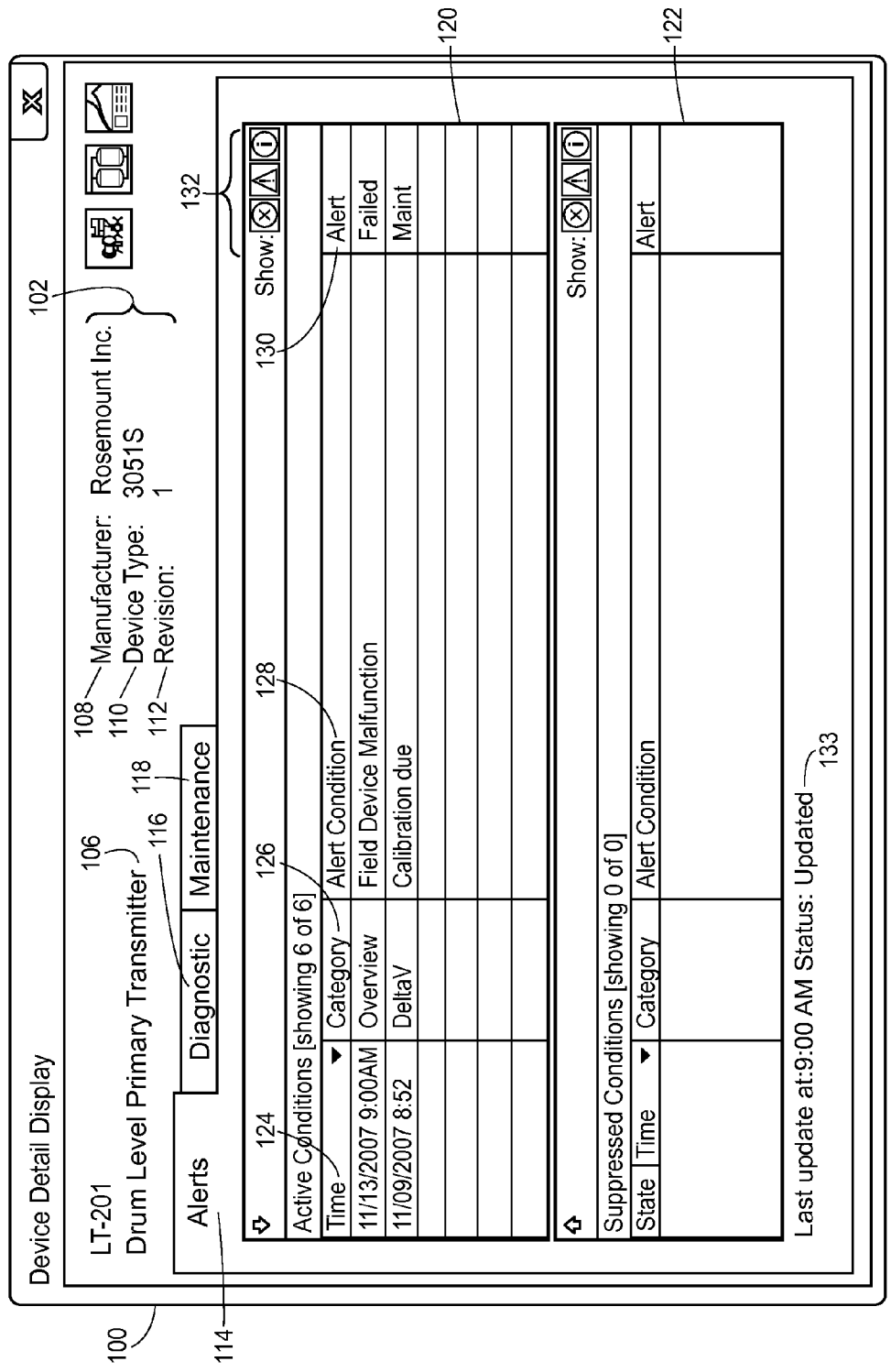
FIG. 3 depicts an exemplary device detail display in accordance with an embodiment of the present description.

In some embodiments, an operator, maintenance technician, configuration engineer, etc. may view a device detail display revealing device alert conditions, diagnostic parameters, and common maintenance information. The device detail display may be available in one or more of the operator interface application 80, one of the diagnostics applications 78, the configuration application 76, and the asset management application 84. FIG. 3 illustrates an exemplary device detail display 100. An area 102 of the display 100 provides standard, static information (e.g., device tag data) for the field device to which the display 100 pertains. For example, the area 102 may include a device tag name 104, a device description 106, a device manufacturer 108, a device type 110, and a device revision 112. While not illustrated in the display 100, the display 100 may also include a device model number and/or one or more user-definable values.

The display 100 may also provide one or more pages or tabs of information including an alert information tab 114, a diagnostic information tab 116, and/or a maintenance information tab 118. FIG. 3 depicts a display 100 having the alerts tab 114 selected. When selected, the alerts tab 114 may display one or both of a list 120 of active conditions and a list 122 of suppressed conditions. Each of the lists 120 and 122 may show details about various alert conditions displayed. For example, the list 120 depicts the time 124, the category 126, the specific condition 128 (e.g., malfunction, calibration due, etc.), and the alert type 130 (e.g., FAIL, MAINT, OFFSPEC, CHECK, ADVISORY etc.) for each listed alert. Each of the lists 120 and 122 may also include controls 132 (e.g., check boxes, toggle buttons, etc.) for selecting the types of alerts displayed. The display 100 may also include an indication 133 of the last update time for the displayed information.

Figure 4:
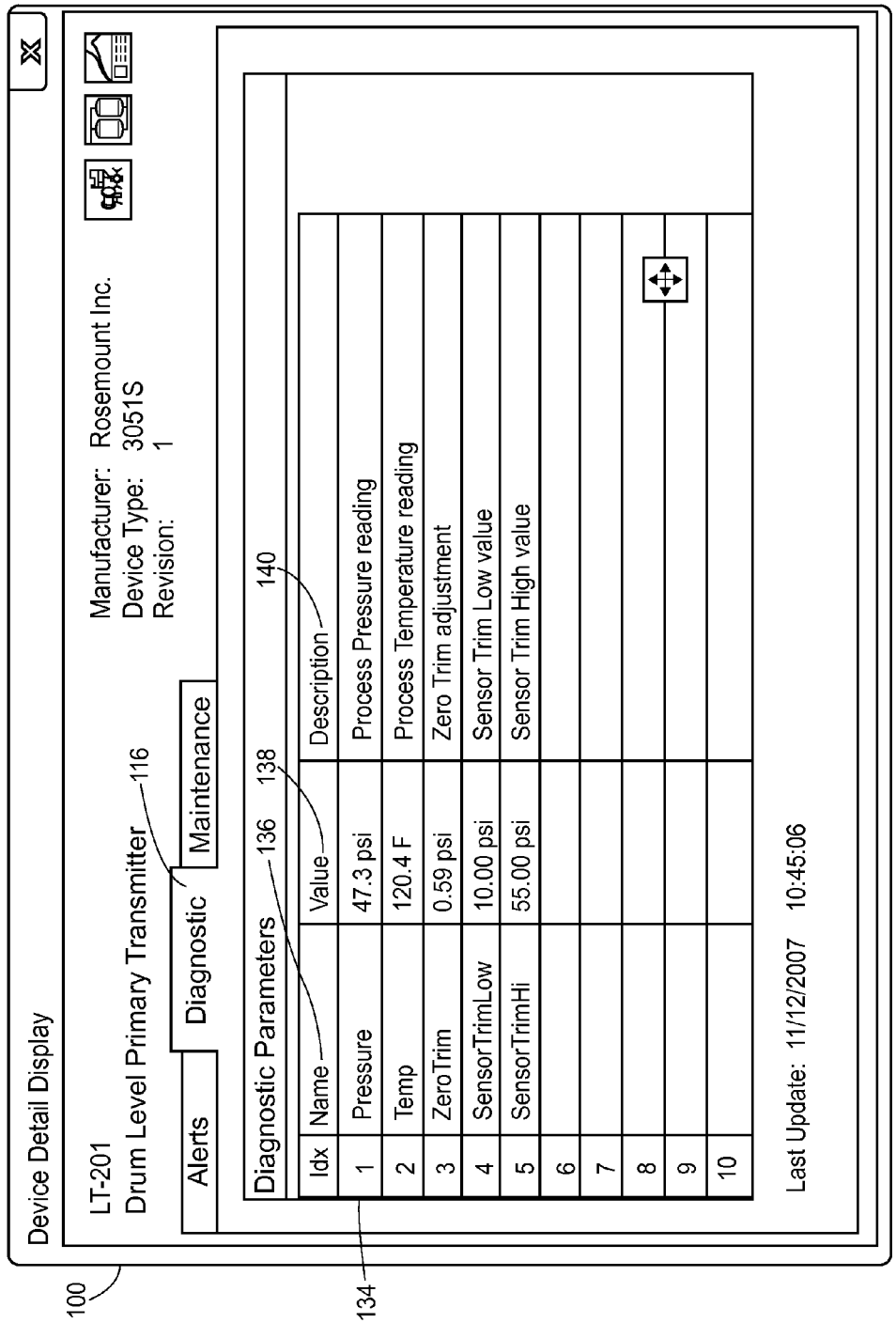
FIG. 4 depicts the exemplary device detail display of FIG. 3, having selected a different display tab.

With reference now to FIG. 4, the diagnostic tab 116, when selected, causes the display 100 to depict a list 134 of diagnostic parameters 136 of the selected device. As just one example, the display depicted in FIG. 4 shows that for the Drum Level Primary Transmitter selected, the diagnostic parameters include pressure, temperature, Zero Trim, Sensor Trim Low, and Sensor Trim Hi. Of course, the displayed parameters may be any diagnostic parameters available for the selected device. For each of the displayed diagnostic parameters 136, the display 100 also depicts a value 138 and a description 140.

For each of the device specific parameters available in the device detail display 100, the parameter value will be retrieved periodically from the device and cached in the data structure 94, 96, and the parameter value status will be determined and stored. The device display 100 will display the parameters without requiring any user configuration. Instead, each device will have a set of diagnostic parameters and values defined in a device definition in the device tag (i.e., in the configuration library 53 or stored on the field device). Each diagnostic parameter has a name, and supports a current value (CV) field, a description field, a value status field, and possibly other fields. Each device may have defined for it by the manufacturer a context screen that may be displayed by a maintenance application.

In some embodiments, the information associated with a device tag will support and/or configure additional management information that provides information for all devices. For example, a maintenance mode parameter may be added to allow an operator to identify whether the associated device is available for offline maintenance activity. When the device is "in service," the I/O devices 56, 58, 60 disable write commands via a pass-through communication to the device to prevent inappropriate manipulation of the device while it is in service. For instance, when a transmitter (e.g., the LT-201 transmitter of the exemplary display 100) is "in service," calibration commands may be disabled and prevented from reaching the device, while read commands (to read a parameter value, for example) may be permitted. In some embodiments, an additional maintenance lock or state may also be supported. The parameter may allow a device to be placed in a maintenance state to provide confirmation that a device is available for maintenance or, if the parameter indicates that the device is not in a maintenance state, that the device is available for service (in the process).

As another example, a calibration due date may be added to allow the runtime system and the operator to determine if the device is in calibration or approaching its calibration due date. Likewise, a calibration state may also be included among the parameters in the device tag. The calibration state may be set to TRUE when the device falls out of calibration. Where the device tag natively supports the calibration due date parameter, the device tag may read the date from the device and allow the maintenance software to manage the device normally. For all other devices, the field may be available to the user and may be set either manually through the device detail display or programmatically from a separate application.

For devices that include native support for device diagnostic data (i.e., devices storing on-board device tags operable to configure device diagnostic data), such as data from one or more statistical processing module (SPM) blocks (also sometimes referred to as Advanced Diagnostic Blocks (ADBs)), the device diagnostic data values (e.g., mean, standard deviation, etc.) may also periodically be retrieved and stored from the SPM blocks and may be displayed in the detail display, with no configuration required by the user.

Figure 5:
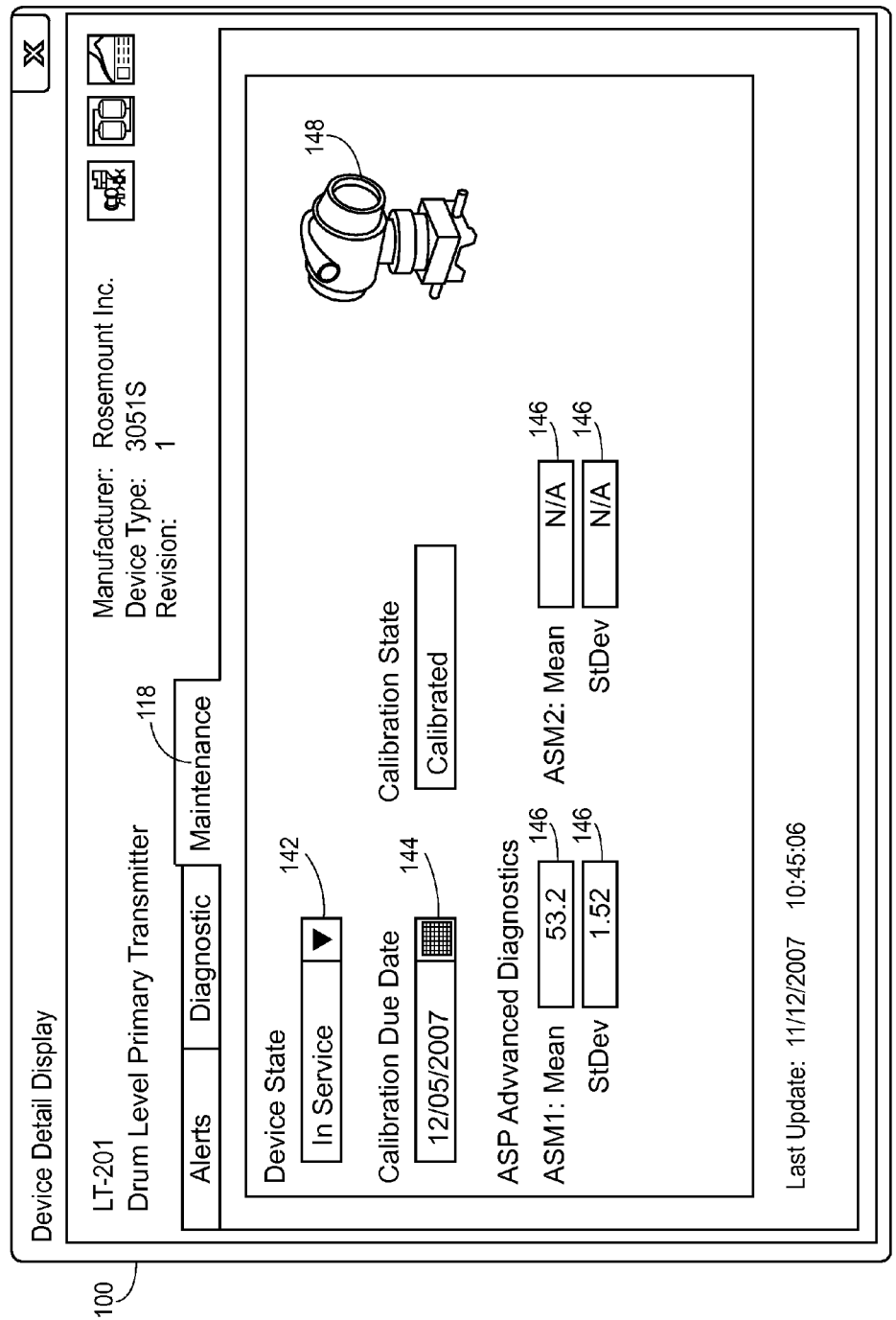
FIG. 5 depicts the exemplary device detail display of FIGS. 3 and 4, having selected still a different display tab.

FIG. 5 illustrates the exemplary display 100 having the maintenance tab 118 selected. When selected, the maintenance tab 118 displays information related to common maintenance tasks, and maintenance information defined by the device manufacturer. The information may include an indication 142 of the device state, an indication 144 of the calibration due date, one or more advanced diagnostics parameters or values 146 (such as values output by a statistical processing module (SPM) function block), an image 148 of the device, the calibration state 150, or any other device maintenance information available. Some of the information displayed on the maintenance tab may be modifiable by the user. For example, the device state indication 142 may be modifiable to indicate that the device is in service or to indicate that the device is out of service, and the calibration due date 144 may be modifiable to set a new date after calibration is performed. Controls for modifying values may be any known interface control, such as pull-down menus, radio buttons, pop-up windows, text entry boxes, check boxes, etc.

As described above, the retrieved device diagnostic data is cached so that it is available without requiring the data to be retrieved concurrently with the request to view or use the data. That is, as described above, the device diagnostic data may not be updated as regularly as control data and, therefore, is not generally used for control (though, in some instances, it may be used for control). However, runtime applications such as displays, histories, control modules, etc.) may have full access to the device tag information (i.e., device tag data and/or device diagnostic data) without requiring the presence of the configuration database 50.

In some embodiments, little or no input is required from a system engineer to configure a device to provide device diagnostic data. Instead, each device is assigned a corresponding device definition from the configuration library 53 during the configuration of the system, which automatically configures the device alerts and diagnostic parameters in the device. The device tag assumes the name given to the device, and the alerts and diagnostic parameters are referenced with the tag in control strategies and graphics. Thus, the configuration engineer does not need to configure diagnostic parameter paths for field devices for which a device definition is available. In some embodiments, the device definition information includes any available diagnostic values in the device that are dynamically updated in runtime. All of the detail in the device detail display 100 is also defined in the device definition.

The configuration engineer may complete the device tag configuration by providing a description and a primary control display. FIGS. 6A and 6B depict respective tabs of a configuration dialog box 160 that allows a configuration engineer to modify or program various aspects of a device tag description. In FIG. 6A, the configuration dialog box 160 has a general tab 162 selected. The general tab 162 includes an indication 164 of the object type, an indication 166 of when the device properties were modified, and an indication 168 of the operator or engineer who last modified the device properties. A field 170 automatically populates with a device tag 172, which may be modified by an operator or configuration engineer, along with a description field 174, a device ID field 176, and an address field 178. Three fields 180, 182, 184 populate automatically to reflect the device manufacturer, device type, and device revision, respectively.

FIG. 6B depicts the configuration dialog box 160 with an Alarms & Displays tab 186 selected. On the Alarms & Displays tab 186, a configuration engineer may set various displays to be associated with the device, including setting a primary control display in a field 188, a detail display in a field 190, and a faceplate display in a field 192. Upon selection of a device definition, each of the fields 188, 190, and 192 may be automatically populated with corresponding displays by default. Fields 194 and 196 for selectively enabling device alarms and device alert re-annunciation, respectively, may also be automatically set upon selection of a device definition.

In some embodiments, a diagnostics tab 198 may include fields (not shown) defining all possible device diagnostic data parameters of the device. Each of the device diagnostic data parameters may have an associated control (not shown) for selectively enabling the parameter to be actively retrieved during runtime. The configuration engineer may select from the list of parameters to add or remove parameters from active retrieval from the device. The selected parameters may be available through the maintenance application.

Referring now to FIG. 7 an exemplary display illustrates one view in which device diagnostic data may be used. Specifically, FIG. 7 illustrates a process alarm summary display 200. The alarm summary display 200 retrieves cached device diagnostic data and allows an operator or maintenance technician to easily view all active/suppressed alarm/alert conditions for various devices. The display 200 may have a variety of columns, each of which may display device diagnostic data or other data associated with the process control system. The display 200, by way of example, includes a column 202 indicating with an icon 204 whether the alarm/alert is a warning, a failure, a maintenance condition, etc. A column 206 indicates the date and time that the alarm/alert was generated. A column 208 indicates the device tag associated with the alarm/alert. A column 210 indicates a description of the tag. A column 212 indicates a category (e.g., device, process, system) of the tag. A column 214 indicates the alarm/alert (e.g., Failed, Maintenance, etc.). A column 216 indicates a message associated with the alarm/alert (e.g., bad sensor, high flow, low flow, valve sticking, valve stiction alert, etc.). Other columns (not shown) may be included in the display 200 according to the unique needs of the process, the operators, the maintenance technicians, or other personnel involved with the process.

Figure 8:
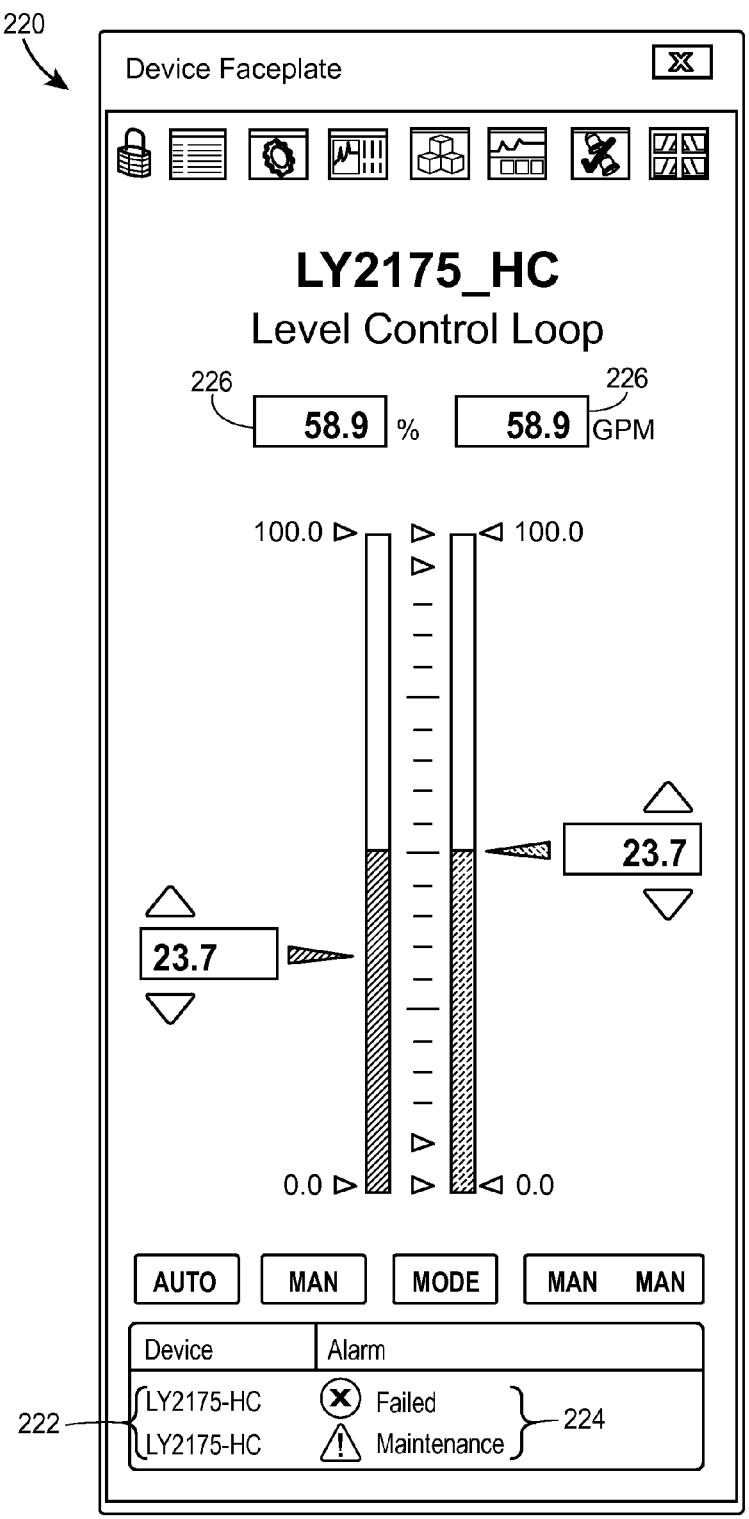
FIG. 8 depicts another exemplary display that illustrates a second view in which device diagnostic data may be used.

FIG. 8 depicts another exemplary display that illustrates a second view in which device diagnostic data may be used. In particular, a control faceplate 220 of a device is illustrated. The control faceplate 220 lists the devices (222) referenced by the control module and the highest priority active alert (224) for each device. While some information in the control faceplate 220, such as the current values 226 for the control loop, may be presented in real-time (e.g., because they are part of the control routine), the device diagnostic data, such as the active alerts 224 may also be presented in the faceplate 220 without otherwise affecting the operation of the control routine. That is, because the device diagnostic data are downloaded in the background, and not in real time, the device alarm/alert data, for example, may be presented to the operator in the control faceplate 220, regardless of whether the bus is free to download the real-time status of the alarm/alert.

Figure 9:
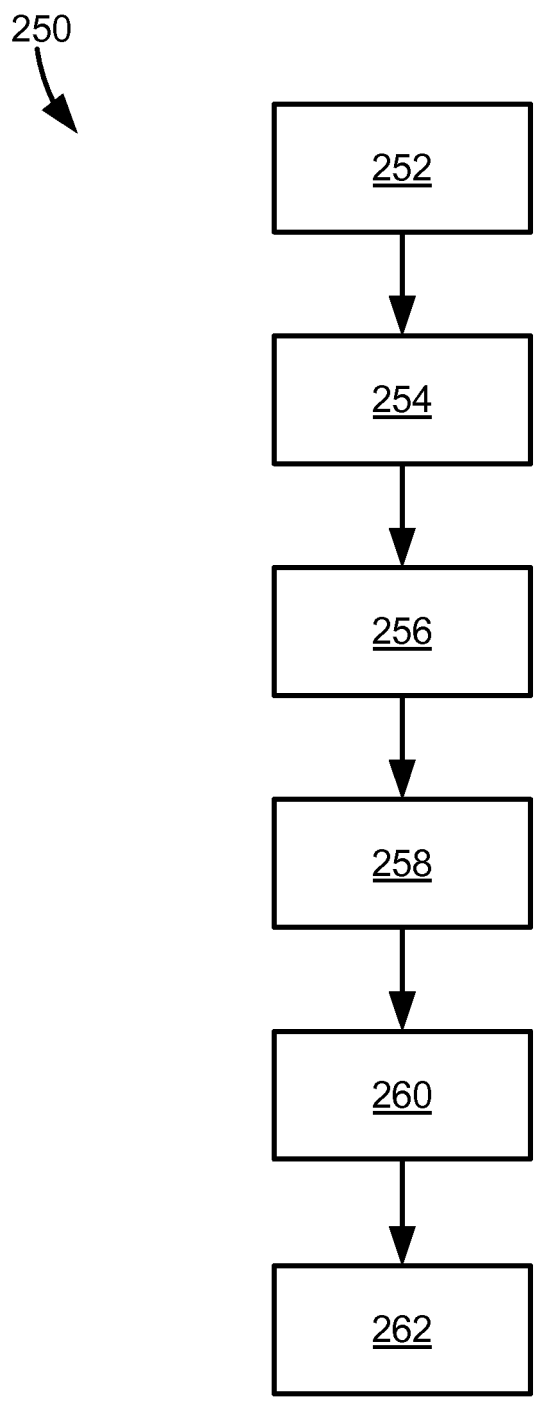
FIG. 9 is a flow chart depicting an exemplary method in accordance with the present description.

FIG. 9 depicts a method 250 for controlling a process according to the presently described embodiments. The method may be embodied as a set of machine readable instructions stored on a tangible, non-transitory storage medium, and executable by one or more processors to cause the method to be executed. Alternatively, in some embodiments, the instructions may be programmed in hardware (e.g., in a field programmable gate array (FPGA) or an application specific integrated circuit (ASIC)). With reference to FIG. 9, a process control field device (e.g., one of the field devices 62, 63A-C, 64A-D) is communicatively coupled to a process controller such as the process controller 54 via an input/output device such as the I/O devices 56, 58, 60 (block 252). A device tag for the field device 62, 63A-C, 64A-D is obtained (block 254) and used to configure the I/O device 56, 58, 60 (block 256). Configuration of the I/O device 56, 58, 60 may include configuration of one or more routines (which may also be computer-readable instructions stored on a tangible, non-transitory storage medium or, alternatively, may be instructions programmed in hardware such as an FPGA) to retrieve device diagnostic data from the field device 62, 63A-C, 64A-D, cache the device diagnostic data (e.g., in the data structures 94, 96), and provide one or more applications access to the cached device diagnostic data. The device diagnostic data are retrieved from the field device 62, 63A-C, 64A-D (block 258) and cached (block 260). The cached device diagnostic data are provided to one or more applications (block 262).

Various embodiments of the presently described system and method may include any of the following aspects:

1. A method for controlling a process, the method comprising:
communicatively coupling a process control field device to a process controller via an input/output device;
obtaining a device tag for the field device;
configuring the input/output device according to data in the device tag to:
retrieve device diagnostic data from the field device;
cache the device diagnostic data;
provide one or more applications access to the cached device diagnostic data;
retrieving the device diagnostic data from the field device;
caching the device diagnostic data; and
providing the cached device diagnostic data to the one or more applications.

2. The method according to aspect 1, wherein obtaining a device tag for the field device comprises retrieving device tag data from the field device.

3. The method according to aspect 1, wherein obtaining a device tag for the field device comprises receiving in a configuration application a selection of a device tag to associate with the field device.

4. The method according to any one of the preceding aspects, wherein retrieving the device diagnostic data from the field device comprises retrieving from the field device a value for at least one non-static parameter.

5. The method according to any one of the preceding aspects, wherein retrieving from the field device a value for at least one non-static parameter comprises retrieving a value of at least one of the group consisting of: a calibration state; a calibration due date; a device state; an alert status; an alarm status; a device health status; a measured process parameter; an input of a function block; and an output of a function block.

6. The method according to any one of the preceding aspects, wherein retrieving a value of an output of a function block comprises retrieving a value of a an output of a statistical processing module (SPM) block.

7. The method according to any one of the preceding aspects, wherein retrieving the device diagnostic data from the field device comprises polling the device diagnostic data utilizing bandwidth not otherwise required for real-time process control communications.

8. The method according to any one of the preceding aspects, wherein retrieving the device diagnostic data from the field device comprises polling the device diagnostic data according to an asynchronous call.

9. The method according to any one of the preceding aspects, wherein retrieving the device diagnostic data from the field device comprises polling the device diagnostic data according to a low priority, background task.

10. The method according to any one of the preceding aspects, wherein caching the device diagnostic data further comprises:
determining a data status for each of one or more cached device diagnostic data values; and
storing the determined data status as associated with the corresponding cached diagnostic data value.

11. The method according to any one of the preceding aspects, wherein determining a data status comprises:
determining a time elapsed since the cached device diagnostic data value was retrieved;
comparing the time elapsed to a predetermined threshold value;
determining that the data status is good if the time elapsed is less than the predetermined threshold value; and
determining that the data status is bad if (1) the time elapsed is greater than the predetermined threshold value or (2) an active communication alert exists for the field device from which the device diagnostic data value was retrieved.

12. The method according to any one of the preceding aspects, wherein the predetermined threshold value to which the elapsed time for a first one of the one or more cached device diagnostic data values is compared is different from the predetermined threshold value to which the elapsed time for a second one of the one or more cached device diagnostic data values is compared.

13. The method according to any one of the preceding aspects, wherein caching the device diagnostic data comprises caching the device diagnostic data in a memory device of the input/output device.

14. The method according to any one of the preceding aspects, wherein providing the cached device diagnostic data to the one or more applications comprises providing the cached device diagnostic data to at least one of the group consisting of: a device detail display; an alarm display; and a device faceplate.

15. The method according to any one of the preceding aspects, wherein providing the cached device diagnostic data to the one or more applications comprises providing the device diagnostic data to a control routine.

16. The method according to any one of the preceding aspects, wherein providing the cached device diagnostic data to the one or more applications including a maintenance display and an operator control display, the maintenance display and the operator control display each including cached device diagnostic data and the method further comprising:

identifying a problem with the process in using maintenance display; and fixing the problem with the process using the operator control display.

17. A process control system comprising:

a process controller executing one or more process control routines to control a process;

an input/output device communicatively coupled to the process controller;

a plurality of field devices communicatively coupled to the input/output device via a bus and, via the input/output device, to the process controller, at least one of the plurality of field devices generating device diagnostic data;

a device tag associated with the at least one field device and storing data for configuring the input/output device to retrieve the device diagnostic data from the at least one field device;

a first routine stored as instructions on a first memory device, the routine operable to retrieve the device diagnostic data generated by the at least one field device;

a cache storing device diagnostic data retrieved from the at least one field device; and a second routine operable to read the stored device diagnostic data from the cache and perform a process control function using the device diagnostic data.

18. The process control system according to aspect 17, wherein the device tag for the at least one field device is stored in a memory device disposed within the at least one field device.

19. The process control system according to aspect 17, wherein the device tag is stored in a configuration database and associated with the at least one field device according to an input received via a configuration application.

20. The process control system according to any one of aspects 17 to 19, wherein the device diagnostic data generated by the at least one field device comprises a value for at least one non-static parameter.

21. The process control system according to any one of aspects 17 to 20, wherein the at least one non-static parameter is one of the group consisting of: a calibration state; a calibration due date; a device state; an alert status; an alarm status; a device health status; a measured process parameter; an input of a function block; and an output of a function block.

22. The process control system according to any one of aspects 17 to 21, wherein the at least one non-static parameter is the output of a function block and the output of the function block comprises the output of a statistical processing module (SPM) block.

23. The process control system according to any one of aspects 17 to 22, wherein the first routine is operable to poll the at least one field device using bandwidth not otherwise required for real-time process control communications.

24. The process control system according to any one of aspects 17 to 23, wherein the device diagnostic data stored in the cache comprises:

one or more device diagnostic data values, each of the data values associated with a corresponding device diagnostic data parameter; and a data status corresponding to each of the one or more device diagnostic data values.

25. The process control system according to any one of aspects 17 to 24, wherein the data status is determined according to a comparison of a time elapsed since the corresponding device diagnostic data value was retrieved to a predetermined threshold value.

26. The process control system according to any one of aspects 17 to 25, wherein the predetermined threshold value to which the elapsed time for a first one of the one or more cached device diagnostic data values is compared is different from the predetermined threshold value to which the elapsed time for a second one of the one or more cached device diagnostic data values is compared.

27. The process control system according to any one of aspects 17 to 26, wherein the cache is stored on a memory device of the input/output device.

28. The process control system according to any one of aspects 17 to 27, wherein the second routine is a device detail display routine, an alarm display routine, or a device faceplate display routine.

29. The process control system according to any one of aspects 17 to 28, wherein the second routine is a control routine.

30. The process control system according to any one of aspects 17 to 29, wherein the second routine is a maintenance display routine that includes device diagnostic data stored in the cache and further comprising:

an operator control display routine that includes a user interface component dynamically linked to the one or more process control routines to control the operation of the process via user interaction with the user interface component, such that a problem with the process identified in the maintenance display routine is fixed using the accessible operator control display routine.

31. The process control system according to any one of aspects 17 to 30, wherein the first routine is an asynchronous polling routine.

32. The process control system according to any one of aspects 17 to 31, wherein the first routine is a low priority, background task.

We claim:

1. A method for controlling a process in a plant, the method comprising:

communicatively coupling a field device to a process controller via an input/output device, wherein:

(i) the process controller is a device located in the plant and configured to: (a) receive measurements of process parameters, and (b) generate control signals for controlling the process based on a process control routine and the measurements of process parameters;

(ii) the field device is a device located in the plant and configured to: (a) measure the measured process parameters, or (b) actuate in response to receiving the control signals; and (iii) the input/output device is a device located in the plant and configured to: (a) route the measured process parameters received from the field device to the process controller via a backplane to which the process controller is connected, and (b) route the control signals received from the process controller via the backplane to the field device;

obtaining a device tag for the field device;

configuring the input/output device according to the device tag to:

(i) cause the input/output device to perform prioritized operations including a low priority retrieval of a value of a dynamic device diagnostic parameter for the field device, such that real-time process control communications performed by the input/output device receive priority over the low priority retrieval;

(ii) cache the value of the dynamic device diagnostic parameter; and (iii) provide one or more applications access to the cached value of the dynamic device diagnostic parameter;

retrieving, by the input/output device, the value of the dynamic device diagnostic parameter for the field device before the one or more applications have requested access to the value of the dynamic device diagnostic parameter;

caching the value of the dynamic device diagnostic parameter before the one or more applications have requested the value of the dynamic device diagnostic parameter; and providing the cached value of the dynamic device diagnostic parameter to the one or more applications.

2. The method according to claim 1, wherein obtaining a device tag for the field device comprises retrieving device tag from the field device.

3. The method according to claim 1, wherein obtaining a device tag for the field device comprises receiving in a configuration application a selection of a device tag to associate with the field device.

4. The method according to claim 1, wherein retrieving the value of the dynamic device diagnostic parameter comprises retrieving a value of at least one of the group consisting of: a calibration state; a calibration due date; a device state; an alert status; an alarm status; a device health status; a measured process parameter; an input of a function block; and an output of a function block.

5. The method according to claim 4, wherein retrieving a value of an output of a function block comprises retrieving a value of an output of a statistical processing module (SPM) block.

6. The method according to claim 1, wherein retrieving the value of the dynamic device diagnostic parameter comprises polling the dynamic device diagnostic parameter utilizing bandwidth not otherwise required for real-time process control communications.

7. The method according to claim 1, wherein retrieving the value of the dynamic device diagnostic parameter comprises polling the dynamic device diagnostic parameter according to an asynchronous call.

8. The method according to claim 1, wherein retrieving the value of the dynamic device diagnostic parameter device comprises polling the dynamic device diagnostic parameter according to a low priority, background task.

9. The method according to claim 1, wherein caching the value of the dynamic device diagnostic parameter further comprises:

determining a data status for each of one or more cached values of the dynamic device diagnostic parameter; and storing the determined data status as associated with the corresponding cached value of the dynamic diagnostic data parameter.

10. The method according to claim 9, wherein determining a data status comprises:

determining a time elapsed since the cached value of the dynamic device diagnostic parameter was retrieved;

comparing the time elapsed to a predetermined threshold value;

determining that the data status is good if the time elapsed is less than the predetermined threshold value; and determining that the data status is bad if (1) the time elapsed is greater than the predetermined threshold value or (2) an active communication alert exists for the field device from which the value of the dynamic device diagnostic parameter was retrieved.

11. The method according to claim 10, wherein the predetermined threshold value to which the elapsed time for a first one of the one or more cached values of the dynamic device diagnostic parameter is compared is different from the predetermined threshold value to which the elapsed time for a second one of the one or more cached values of the dynamic device diagnostic parameter is compared.

12. The method according to claim 1, wherein caching the value of the dynamic device diagnostic parameter comprises caching the value of the dynamic device diagnostic parameter in a memory device of the input/output device.

13. The method according to claim 1, wherein providing the cached value of the dynamic device diagnostic parameter to the one or more applications comprises providing the cached value of the dynamic device diagnostic parameter to at least one of the group consisting of: a device detail display; an alarm display; and a device faceplate.

14. The method according to claim 1, wherein providing the cached value of the dynamic device diagnostic parameter to the one or more applications comprises providing the value of the dynamic device diagnostic parameter to a control routine.

15. The method according to claim 1, wherein the one or more applications includes a maintenance display and an operator control display, the maintenance display and the operator control display each including a cached value of the dynamic device diagnostic parameter and the method further comprising:

identifying a problem with the process in using maintenance display; and fixing the problem with the process using the operator control display.

16. A process control system comprising:

a process controller located in a plant and executing one or more process control routines to control a process, the process controller configured to: (a) receive measurements of process parameters for the process, and (b) generate control signals for controlling the process based on the process control routines and the measurements of process parameters;

an input/output device communicatively coupled to the process controller;

a plurality of field devices communicatively coupled to the input/output device via a bus and, via the input/output device, to the process controller, at least one of the plurality of field devices generating a value of a dynamic device diagnostic parameter, the at least one of the plurality of field devices configured to: (a) measure the measured process parameters, or (b) actuate in response to receiving the control signals;

wherein the input/output device is configured to: (a) route the measured process parameters received from the at least one of the plurality of field devices to the process controller via a backplane to which the process controller is connected, and (b) route the control signals received from the process controller via the backplane to the field device;

a device tag associated with the at least one field device; and one or more memory devices storing:

(a) data for configuring the input/output device to perform prioritized operations including a low priority retrieval of the value of the dynamic device diagnostic parameter, such that real-time process control communications performed by the input/output device receive priority over the low priority retrieval;

(b) a first routine operable to cause the input/output device to:
  (i) retrieve the value of the dynamic device diagnostic parameter generated by the at least one field device, and
  (ii) cache the value of the dynamic device diagnostic parameter retrieved from the at least one field device before the value of the dynamic device diagnostic parameter is used to perform a process control function; and (c) a second routine operable to read the stored value of the dynamic device diagnostic parameter from the cache and perform the process control function using the value of the dynamic device diagnostic parameter.

17. The process control system according to claim 16, wherein the device tag for the at least one field device is stored in a memory device disposed within the at least one field device.

18. The process control system according to claim 16, wherein the device tag is stored in a configuration database and associated with the at least one field device according to an input received via a configuration application.

19. The process control system according to claim 16, wherein the dynamic device diagnostic parameter is one of the group consisting of: a calibration state; a calibration due date; a device state; an alert status; an alarm status; a device health status; a measured process parameter; an input of a function block; and an output of a function block.

20. The process control system according to claim 19, wherein the dynamic device diagnostic parameter is the output of a function block and the output of the function block comprises the output of a statistical processing module (SPM) block.

21. The process control system according to claim 16, wherein the first routine is operable to retrieve the value of the dynamic device diagnostic parameter by polling the at least one field device using bandwidth not otherwise required for real-time process control communications.

22. The process control system according to claim 16, wherein:

one or more values of the dynamic device diagnostic parameter are cached, each of the data values associated with a corresponding value of the dynamic device diagnostic parameter; and a data status corresponding to each of the one or more values of the dynamic device diagnostic parameter is stored.

23. The process control system according to claim 22, wherein the data status is determined according to a comparison of a time elapsed since the corresponding value of the dynamic device diagnostic parameter was retrieved to a predetermined threshold value.

24. The process control system according to claim 23, wherein the predetermined threshold value to which the elapsed time for a first one of the one or more cached values of the dynamic device diagnostic parameter is compared is different from the predetermined threshold value to which the elapsed time for a second one of the one or more cached values of the dynamic device diagnostic parameter is compared.

25. The process control system according to claim 16, wherein the value of the dynamic device diagnostic parameter is cached on a memory device of the input/output device.

26. The process control system according to claim 16, wherein the second routine is a device detail display routine, an alarm display routine, or a device faceplate display routine.

27. The process control system according to claim 16, wherein the second routine is a control routine.

28. The process control system according to claim 16, wherein the second routine is a maintenance display routine that includes the value of the dynamic device diagnostic parameter stored in the cache and further comprising:

an operator control display routine that includes a user interface component dynamically linked to the one or more process control routines to control the operation of the process via user interaction with the user interface component, such that a problem with the process identified in the maintenance display routine is fixed using the accessible operator control display routine.

29. The process control system according to claim 16, wherein the first routine is an asynchronous polling routine.

30. The process control system according to claim 16, wherein the first routine is a low priority, background task.

* * * * *